April 9, 1940.          T. S. GRIMES          2,196,728
AUTOMATIC FEED FOR COTTON GINS
Filed Dec. 7, 1938          2 Sheets-Sheet 1
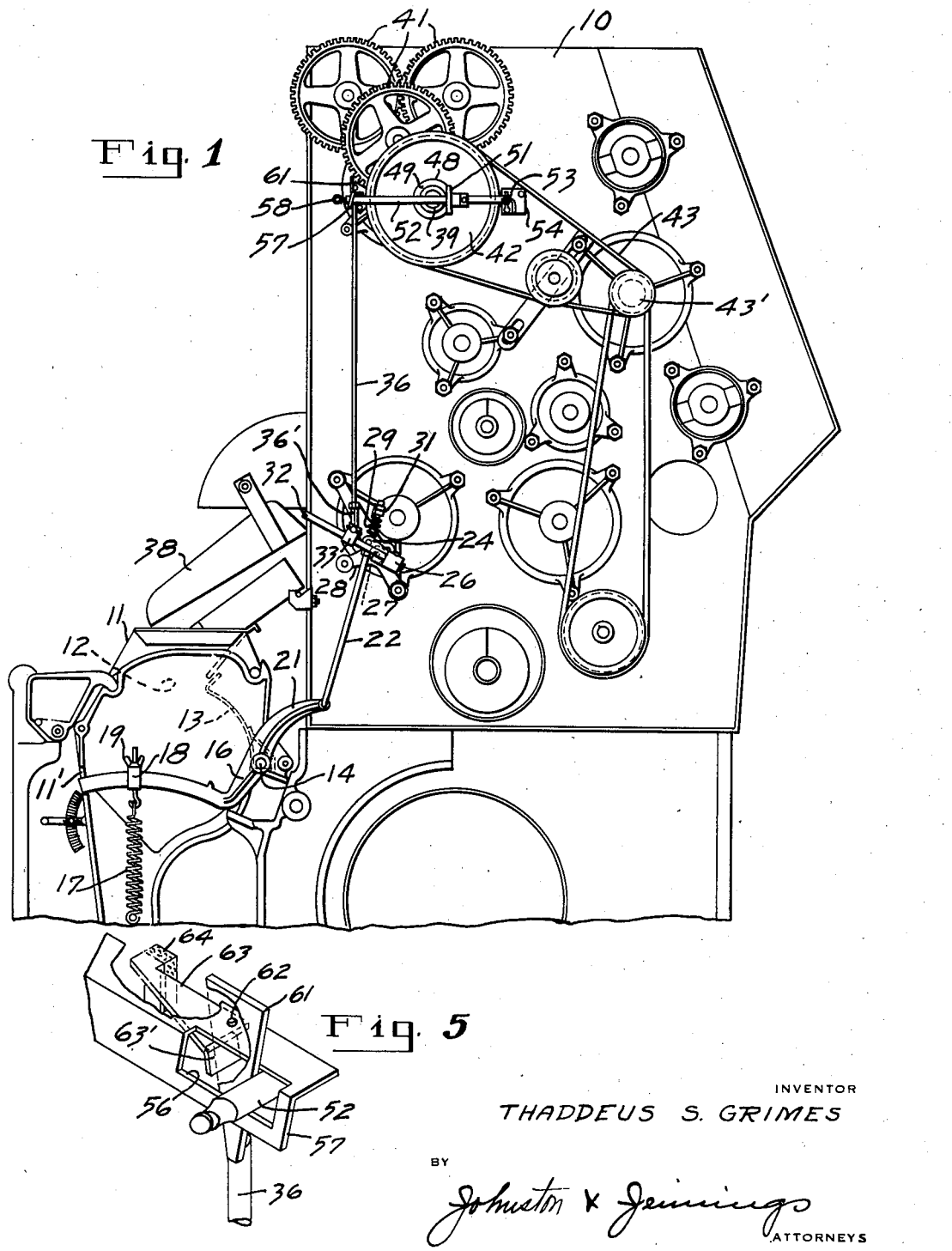
INVENTOR
THADDEUS S. GRIMES
BY
Johnston & Jennings
ATTORNEYS

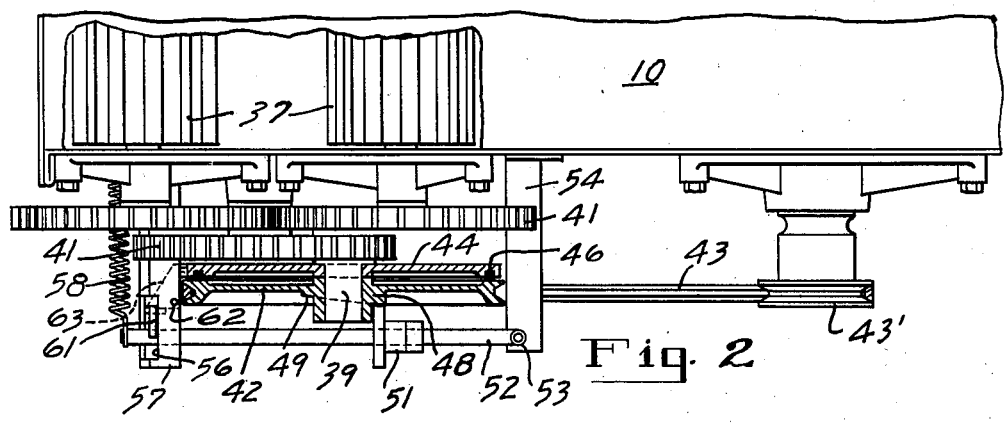
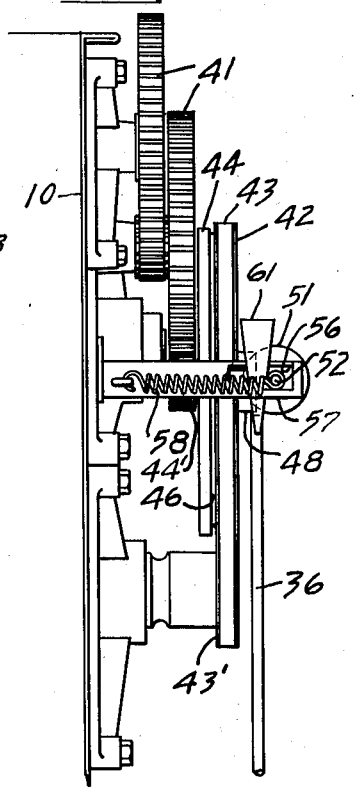
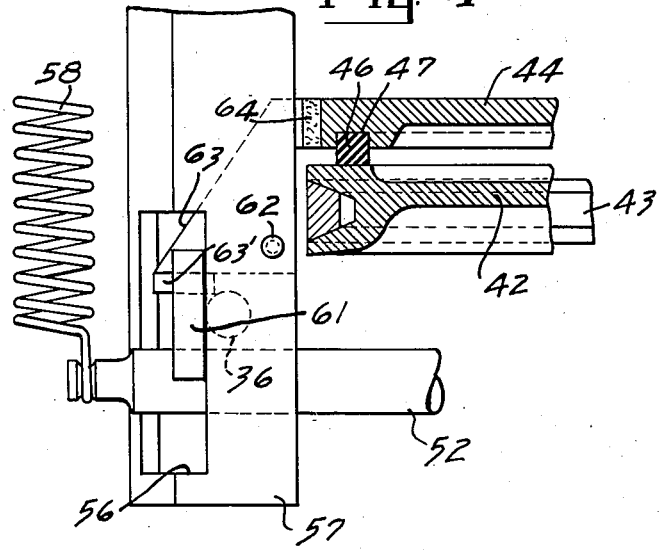
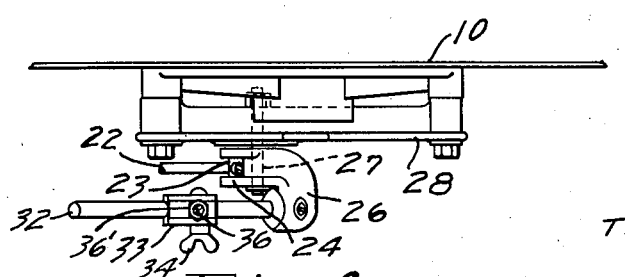

Patented Apr. 9, 1940

2,196,728

UNITED STATES PATENT OFFICE 2,196,728

AUTOMATIC FEED FOR COTTON GINS

Thaddeus S. Grimes, Columbus, Ga., assignor to Lummus Cotton Gin Company, a corporation of Georgia Application December 7, 1938, Serial No. 244,317

7 Claims. (Cl. 74—125.5)

This invention relates to an automatic feed mechanism for cotton gins, and has for its object the provision of apparatus of the character designated which shall be simple of design and operation and which shall operate responsive to the quantity of cotton in the roll box of the gin.

A further object of my invention is to provide mechanism for effecting feed of cotton to a cotton gin responsive to the pressure of cotton in the roll box of the gin and include therein a clutch mechanism automatically operable to effect a graduated variation in feed.

Another object of my invention is to provide, in an automatic feed for cotton gins, an improved clutch mechanism which shall be adapted, responsive to pressure of cotton in the roll box of the gin, to effect a continuous feed, an intermittent feed, or to interrupt entirely the feed of cotton to the gin.

Automatic feed mechanism for cotton gins as heretofore known to me has usually comprised an element or elements responsive to the volume of cotton in the gin, and constantly driven pawl mechanism adapted to drive the feeder rolls, with means operated by the elements movable by variations in the volume of cotton in the gin to bring about engagement and disengagement of the pawls with the driving ratchet or pinion. Such mechanism has necessarily embodied a multiplicity of relatively movable parts, has entailed considerable friction and wear, and the movement of the feeder mechanism has not been possible of graduation to the desired wide range of demand.

In accordance with this invention, I have devised a drive for a feeder responsive to the volume of cotton in the gin, and which embodies a novel friction clutch mechanism adapted to impart to the feeder mechanism a movement graduated to the demand of the gin, and which may be intermittent or constant, with the intermittent drive infinitely variable dependent upon the position of the means responsive to volume of cotton in the gin.

Apparatus embodying features of my invention is illustrated in the accompanying drawings forming a part of this application, in which—

Fig. 1 is an end elevation of a cotton gin feeder equipped with my invention;

Fig. 2 is a plan view of that end of the feeder upon which the mechanism is mounted;

Fig. 3 is a front elevation, showing particularly the clutch control embodied in my improved mechanism;

Fig. 4 is a detail plan view drawn to a larger scale, of the brake and clutch operating mechanism employed with my invention;

Fig. 5 is a detail perspective view of a part of the brake and clutch operating mechanism; and Fig. 6 is a detail plan view of a part of the motion transmitting mechanism.

Referring to the drawings for a better understanding of my invention, I show in Fig. 1 at 10 a well known form of feeder and cleaning mechanism usually employed with a cotton gin and to which my invention is applicable, although it is equally applicable to any form of feeding mechanism employing rotary feeder rolls. Cotton from the feeder 10 is fed into a gin 11, only a fragment of which is shown, and which embodies a roll box 12 with a movable pressure board 13 therein, the pressure board being movable inwardly and outwardly of the roll box in response to the volume of the roll of cotton in the roll box. The pressure board 13 is operatively connected to a shaft 14 extending through the end of the gin stand and on which is mounted a rocker arm 16. The forward end of the rocker arm is biased downwardly by a spring 17 operatively connected to a cuff 18 slidably mounted on the forward end of the rocker arm 16, the position of which is adjustable by means of a thumb screw 19 whereby to vary the force exerted by the spring 17. Upward and downward movement of the outer end of the arm 16 is limited by the ends of a notch 11' on the frame of the gin in which the arm is positioned.

The rear end 21 of the rocker arm 16 has connected thereto a push rod 22, the upper end of which is connected to a block 23 carried by a forked arm 24 of a feed control lever 26, see Fig. 6. The feed control lever 26 is pivotally mounted at 27 on a bracket 28 on the end of the feeder 10, so that as the push rod 22 moves up and down in response to movement of the pressure board 13, the feed control lever is caused to oscillate. A spring 29 and nuts 31 on the upper end of the push rod 22 provide an adjustable yielding connection with the control lever 26, whereby the relative positions of the pressure board 13 and feed control lever may be varied. The control lever 26 is provided with a forwardly extending arm 32 which is adapted to multiply the movements of the push rod 22. Mounted on the forwardly extending arm 32 is a cuff 33, the position of which may be adjusted by means of a thumb screw 34 and to which is connected a control rod 36 which controls the extent to which the feeder is operated in a manner to be described later.

The feeder 10 is provided with rotary feeder rolls 37 which admit cotton into the casing of the feeder 10, and through which it passes by a route not necessary to the understanding of this invention, to be finally fed through a spout 38 into the gin 11. A pulley 42, loosely mounted on a stud or stub shaft 39, is driven from any suitable source of power, as by a belt 43 and pulley 43'. Also mounted on the stub shaft 39, alongside the loose pulley 42, is another loose pulley 44, to one side of which is secured a pinion 44' meshing with a train of gears 41, through which the feeder rolls 37 are driven. A ring of friction material 46 is mounted in a groove 47 in the face of the pulley 44, so that when the constantly driven pulley 42 is pressed toward the pulley 44, it engages the friction material and causes the pulley 44 to turn, which in turn drives the feeder rolls 37 through the train of gears 41.

The pulley 42 has a hub 48, the outer surface 49 of which is inclined to the axis of rotation of the pulley so as to provide a cam surface. Adapted to bear against the cam surface 49 is a roller 51 mounted upon a shaft 52 which is pivoted at 53 to a bracket 54 secured to the end wall of the feeder 10. The shaft 52, as shown, extends across the face of the pulley 42 and through a slot 56 in an angular bracket 57 which is mounted on the end wall of the casing of the feeder 10 on the side of the pulley 42 opposite the bracket 54. A spring 58 is connected to the free end of the shaft 52 to pull it with its roller 51 toward the loose pulley 42 and causes the roller 51 to bear against the cam surface 49 of the hub 48 to bring about engagement of the loose pulleys 42 and 44.

The bracket 57, as shown in Figs. 1 and 5, may conveniently be made from a piece of angle iron, and the slot 56 extends both through the upper horizontal portion and the vertically inclined portion of the angle, as shown in Fig. 5. Extending upwardly through the slot 56 and bearing against the shaft 52 on its side adjacent the pulley 42, is a wedge 61 which is connected to the upper end of the control rod 36, so that it is movable up and down in response to the volume of cotton in the roll box 12. An increase of cotton in the roll box 12 acts to pull the wedge 61 downwardly, whereas upon a decrease of cotton in the roll box the wedge 61 is moved upwardly.

Pivotally mounted at 62 on the horizontal portion of the bracket 57, on the opposite side of the slot 56 from the shaft 52, is a triangular member 63 which carries a friction shoe 64 made of leather or other suitable material, and which is adapted to bear against the rim of the pulley 44 when the wedge 61 is brought to bear against the adjacent surface 63' of member 63.

Inasmuch as the wedge 61 is freely movable laterally in the slot 56, it will be seen that the brake shoe 64 is brought to bear forcibly against the wheel 44 only when the wedge is in a position low enough to push shaft 52 outwardly a sufficient distance for the roller 51 to clear the cam surface 49 on the pulley 42. Then the force of the spring 58 acts through the shaft 52 and the wedge 61 to bear forcibly against the brake and stop rotation of the pulley 44 and feed rollers 37. When the wedge 61 is in a sufficiently elevated position for the shaft 52 to move inward and the roller 51 to bear against the cam surface 49 constantly, then, as may be seen in Figs. 2, 4 and 5, the pressure is taken off the brake shoe 64, the frictional clutch between the pulleys 42 and 44 is engaged, and the feed rollers 37 are driven continuously.

Due to the fact that the surface 49 of the hub 48 is inclined to the axis of rotation of the pulley 42, it will be seen that the wedge 61 may assume a position where the roller 51 will be against the surface of the hub for only a fraction of a revolution of the pulley 42. The degree of engagement will depend upon the position of the wedge, and as the wedge is an inclined surface, may vary infinitely. It will be seen, also, that when the roller 51 is not in engagement with the surface of the hub, the brake 64 is applied, stopping rotation of the pulley 44. There is thus provided an intermittent drive which is closely graduated to the demands of the gin, as evidenced by the volume of cotton in the roll box. Should there be a momentary heavy demand for cotton, the wedge 61 would assume such a position that the roller 51 would be in engagement with the surface 49 of the hub for the entire revolution of the wheel 42, whereupon the pulley 44 would revolve equally with the pulley 42 and the supply of cotton would be increased to maximum feed.

It will also be seen from the drawings that the pressure board 13 assumes a position in the roll box 12 responsive to the volume of cotton, or density of the roll in the roll box. As the volume increases, the pressure board 13 swings outwardly, pulling the push rod 22 and control rod 36 downwardly. When the volume of cotton in the roll box decreases, the pressure board moves inwardly to cause the control rod 36 to move upwardly, thereby determining the position of the wedge 61 which is mounted on the upper end of the control rod.

The length of rod 36 is adjustable by means of a special nut 36'. The proper adjustment is such that with the gin breast in ginning position and with the cuff 33 in its extreme right hand position on the feed control lever 26, the wedge 61 is in a position to just cut off the feed, and in this position no feed can be had as any movement of the rod 22 up or down will not move the rod 36, because the cuff 33 is centrally located with the pin around which the lever 26 and arm 32 swing.

If the cuff 33 is moved out to any point short of the extreme end of arm 32, then the full movement of the lever 16 will not give the maximum feed, because the wedge on end of rod 36 is not pushed up high enough to give a full maximum feed but a feed limit below maximum in proportion to the position of the cuff 33 between no feed and full or maximum feed.

The movement of lever 16 is limited by the length of the notch 11' in the flange of the gin frame 11, yet this movement is enough for the wedge 61 to move up and down to give from no feed to maximum feed when cuff 33 is at the outer end of arm 32. But if the cuff 33 is only halfway out on arm 32, then a full movement of the lever 16 will give a range of feed from no feed to approximately half the maximum. This is because the wedge 61 may not be pushed high enough to let the shaft 52 have full movement, but transfers the load pull of the spring 58 for a part of a revolution from the roller 51 against cam 49, to the brake 64, against pulley 44, with the result that there is only a partial revolution imparted to the wheel 44. This is less as the cuff is moved nearer to the center of the control lever arm 32, and increases when moved nearer the outer end of arm 32. This is a very valuable feature, as it enables the ginner to fix the maximum feed for the gin and limit it more nearly to the optimum rate of ginning.

If the cuff 18 on rocker arm 16 is moved to the right, as viewed in Fig. 1, for slow ginning, and the cuff 33 is left out at the end of arm 32, there results a maximum feed so much in excess of the rate ordinarily desired to gin that there is a heavy overloading of the gin before it can be controlled, and a suddent increasing of the volume in the roll box. The feed will then be cut off completely and will remain cut off until the maximum feed in transit through the feeder has stopped coming. This results temporarily in a very much increased volume of cotton in the roll box which has to be ginned out to where the rocker arm 16 will start down, then as there is no feed coming the rocker arm will quickly drop all the way down and start the excessive feed coming again. But if the cuff 33 is located on the arm 32 at a point to give maximum feed just a little in excess of the rate of ginning, then the feed control will be in a more balanced ratio between the rate of ginning and the maximum feed. Under such conditions the volume in the roll box builds up gradually and the rocker arm 16 rises slowly, gradually reducing the feed to where it is automatically controlled to keep a uniform volume of cotton in the roll box and uniform ginning maintained.

It will be obvious from the foregoing that I have devised an automatic feed for cotton gins which is extremely sensitive to the demand for cotton in the gin, and which is capable of extremely close regulation.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a friction clutch drive for a cotton gin feeder, spring biased cam means for operating the friction clutch to drive the feeder to an extent dependent upon the position of said spring biased cam means, means automatically responsive to the volume of cotton in the gin to control the operating position of the spring biased cam means and to disengage the same entirely from the friction clutch, and other means for exerting a braking force on the feeder upon disengagement of the friction clutch.

2. A drive mechanism comprising two clutch elements loosely mounted side by side on a common shaft, constant drive means for one of the elements, friction means for engaging the two elements when pressed toward each other, a cam faced hub on one of the elements, a lever having a roller thereon adapted to bear against the hub to press its associated element toward the other element, means to bias the lever with its roller toward the hub, and automatically operable variable means to move the lever with its roller away from the hub to disengage the friction means.

3. In a drive for a feeder for cotton gins, a friction clutch comprising a pair of clutch elements loosely mounted on a common shaft with interposed friction means, constant drive means for one element, a cam surfaced hub on one side of the constantly driven element, a spring biased roller bearing against the hub to effect frictional engagement of its associated element with the other element to drive the feeder, and variably actuated wedge means for effecting disengagement of the roller from the cam.

4. In a drive for a cotton gin feeder, a frictional clutch comprising two loose clutch elements mounted on a common shaft with interposed friction means, constant drive means for one element, a cam faced hub on said element, a roller spring biased toward the cam surface of the hub to effect frictional engagement with the other element to drive the feeder, variably actuated wedge means for effecting disengagement of the roller from the hub, and brake means operable responsive to movement of the wedge means upon disengagement of the roller to stop rotation of the other clutch element.

5. In a drive for a cotton gin feeder, a friction clutch comprising a pair of clutch elements loosely mounted on a common shaft with interposed friction means, constant drive means for one element, a hub on said element having its outer face inclined to the axis of rotation to provide a cam surface, a pivoted shaft spring-biased toward the hub and extending across in front of said hub, a roller on the shaft adapted to bear against the hub, and variably actuated wedge means acting on the free end of the pivoted shaft to control the engagement of the roller with the hub of said pulley.

6. In a drive for a feeder for cotton gins, a friction clutch comprising a pair of clutch elements loosely mounted on a common shaft with interposed friction means, constant drive means for one of the elements, a hub on said element having its outer face inclined to the axis of rotation to provide a cam surface, a pivoted shaft spring-biased toward the hub and extending across in front of said hub, a roller on the shaft adapted to bear against the hub, variably actuated wedge means acting on the free end of the pivoted shaft to control the engagement of the roller with the hub of the pulley, and a brake for the other clutch element operable responsive to movement by the wedge means upon disengagement of the roller from the hub.

7. In a drive for cotton gins, a friction clutch comprising a pair of clutch elements loosely mounted on a common shaft with interposed friction means, constant drive means for one of the elements, a hub on said pulley having its outer face inclined to the axis of rotation to provide a cam surface, a pivoted shaft extending across in front of said element, a roller on the shaft adapted to bear against the hub, a spring attached to the free end of the shaft for biasing it toward the hub, a brake for the other pulley disposed alongside the free end of the shaft, and variably actuated wedge means interposed between the free end of the lever and the brake to control the application of the brake and the disengagement of the roller from the hub.

THADDEUS S. GRIMES.